United States Patent
Beshore et al.

[11] Patent Number: 6,010,640
[45] Date of Patent: Jan. 4, 2000

[54] SALT FREE LITHIUM HYDROXIDE BASE FOR CHEMICAL OXYGEN IODINE LASERS

[75] Inventors: David G. Beshore, Newbury Park; David Stelman, West Hills, both of Calif.

[73] Assignee: Boeing North American, Inc., Seal Beach, Calif.

[21] Appl. No.: 08/680,762

[22] Filed: Jul. 15, 1996

[51] Int. Cl.[7] .............................. C01D 1/04; C01B 13/00; H01S 3/22
[52] U.S. Cl. ...................... 252/183.14; 372/55; 372/89; 423/579; 423/641
[58] Field of Search .................... 423/272, 579, 423/641; 252/183.14

[56] References Cited

U.S. PATENT DOCUMENTS

| | | | |
|---|---|---|---|
| 4,643,889 | 2/1987 | Uchiyama et al. | 423/579 |
| 5,378,449 | 1/1995 | Dinges | 423/579 |
| 5,417,928 | 5/1995 | McDermott | 423/579 |
| 5,624,654 | 4/1997 | Clendening, Jr. et al. | 423/579 |

*Primary Examiner*—Wayne Langel
*Attorney, Agent, or Firm*—Steven E. Kahm; Lawrence N. Ginsberg

[57] ABSTRACT

Basic hydrogen peroxide used in chemical oxygen lasers can be produced using a lithium based lithium hydroxide with a lithium hydroxide makeup of the reacted basic hydrogen peroxide. Lithium hydroxide, water and hydrogen peroxide are mixed and 1) passed over a lithium hydroxide solid bed or 2) premixed with small particulate solid lithium hydroxide or lithium hydroxide monohydrate. The basic hydrogen peroxide produced is chilled and stored cold until mixed with chlorine to produce singlet delta oxygen for use in the chemical oxygen iodine laser. The spent basic hydrogen peroxide is rejuvenated by passing it over a solid lithium hydroxide or in-situ solid particulate lithium hydroxides. After dissolution, the rejuvenated basic hydrogen peroxide is then reacted with chlorine to produce more singlet delta oxygen.

14 Claims, 5 Drawing Sheets

| BHP Formulation | Effective Utilization (Base Molar Change) | BHP Weight (lbs) | Weight Savings (lbs) | Weight Savings (%) | BHP Volume (Gallons) | Final Salt Concentration (wt.%-Solute Free) | Factor Above Salt Solubility Limit |
|---|---|---|---|---|---|---|---|
| Baseline: KOH | 6 | 15,000 | 0 | 0 | 1,092 | 32 | 8.0 X (Over Salt Limit) |
| Mixed Hydroxides | 4.5 | 15,813 | (813) | (5.4) | 1,458 | 21 | TBD (Complicated Phase Chemistry) |
| Mixed Hydroxides + LiOH Makeup (Slurry) | 6 | 11,043 | 3,957 | 26.4 | 1,093 | 35 | TTBD (Complicated Phase Chemistry) |
| All Lithium (LiOH + LiOH Makeup) (Slurry) | 12 | 5,261 | -9,739 | 64.9 | 546 | 47 | 0.9 X (Under Salt Limit) |

*Fig. 1*

| | Solution Density (~5 molar) | Molecular Weight | Solubility* (g/100 g solution) | Solubility* (Mole per Liter) | $K_{sp}$ Solubility Product (Mole per Liter)$^2$ |
|---|---|---|---|---|---|
| LiOH | 1.10 | 23.95 | 13 | 5.26 | 26.67 |
| NaOH | 1.20 | 39.98 | 42 | 11.55 | 133.54 |
| KOH | 1.40 | 56.10 | 97 | 24.21 | 585.97 |
| LiCl | 1.15 | 42.39 | 64 | 19.17 | 367.49 |
| NaCl | 1.21 | 58.43 | 36 | 7.39 | 54.61 |
| KCl | 1.27 | 74.56 | 28 | 4.27 | 18.12 |
| $H_2O_2$ | | 34.10 | — | — | — |

* Based on Literature Sources: Mullen (1961)

*Fig. 2   Prior Art*

SALT FREE LITHIUM HYDROXIDE BASE FOR CHEMICAL OXYGEN IODINE LASERS

BACKGROUND AND FIELD OF THE INVENTION

1. Field of the Invention

This invention relates to hydroxide bases for making basic hydrogen peroxide for use in chemical oxygen iodine lasers and more particularly to using high concentration lithium hydroxide bases.

2. Description of Related Art

Potassium-based basic hydrogen peroxides (hydroxides with equimolar or greater hydrogen peroxides) have been used in chemical oxygen iodine lasers (COIL). This conventional method of producing basic hydrogen peroxide has been used for years but has a salting out problem (potassium chloride precipitate) when low to moderate depiction of the base results from reaction with chlorine. The resultant basic hydrogen peroxide (BHP), when mixed with chlorine to yield singlet delta oxygen (an excited state of oxygen), produces salt at less than 1 mole/liter of base consumed. The salt is undesirable as it clogs the singlet delta oxygen generator in the chemical oxygen iodine laser.

Also, these potassium based BHP have exhibited high water vapor pressures due to their low hydrogen peroxide content. The heat of the reaction is high and must be disposed of which is a problem for weight limited airborne applications. Potassium based basic hydrogen peroxides exhibit low freezing points on the order of less than −30° C. and moderate viscosities of less 30 centipoise at 0° C. Potassium based basic hydrogen peroxides also exhibit high liquid densities (greater than 1.3 grams per cubic centimeter). High water vapor pressure reduces laser power and beam quality. High weight is not desirable for airborne or space applications of chemical oxygen iodine lasers.

SUMMARY OF THE INVENTION

Chemical oxygen iodine lasers for airborne and space-based lasers require light weight, salt free chemical reactions with a low heat of reaction and low water vapor pressure. Lithium-based hydroxides, for forming basic hydrogen peroxides, and used in creating the singlet delta oxygen for the chemical oxygen iodine laser, can be used to lower the weight of the chemicals on board an airborne or space application. Mixing lithium hydroxide, water and hydrogen peroxide produces a lithium hydroxide base mixture for producing lithium-based basic hydrogen peroxide. Lithium-based basic hydrogen peroxides can be easily rejuvenated, after reaction with chlorine to form the singlet delta oxygen (an exothermic reaction), by passing the hydroxide solution over lithium hydroxide solids. A variety of makeup methods are possible through the use of either small particulates in the slurry form of the basic hydrogen peroxide or by passing the solution over a granular bed of lithium hydroxide material.

Further, lithium hydroxides can be used at higher molarities of base concentrations without producing salts which can clog components of the airborne laser. Salt free lithium hydroxide base basic hydrogen peroxides can be formulated to achieve up to 12 to 14 molar equivalent lithium hydroxides without salt formulation or solid salt precipitation. This method considerably lowers the overall weight of chemicals needed for the laser.

Also, the heat of reaction is lower for lithium hydroxides thereby reducing the size and weight of cooling equipment. Lithium hydroxides also have lower densities than potassium hydroxides thus lowering the weight of the chemicals needed to power the laser.

OBJECTS OF THE INVENTION

It is an object of the invention to provide a lower weight method of producing basic hydrogen peroxide for use in airborne and space-based chemical lasers.

It is also an object of the invention to provide a lower vapor pressure of basic hydrogen peroxide.

It is a further object of the invention to provide a saltless solution when the basic hydrogen peroxide is reacted with chlorine in the oxygen generator of a chemical oxygen iodine laser.

It is a further object of the invention to provide high molarity solutions for producing basic hydrogen peroxide.

It is a further object of the invention to rejuvenate the spent basic hydrogen peroxide for further use.

It is a still further object of the invention to reduce the heat of the reactions to produce basic hydrogen peroxide such that the need for cooling equipment is reduced.

It is also an object of the invention to increase the duration of operation of the airborne laser for the same weight system.

Other objects, advantages and novel features of the present invention will become apparent from the following detailed description of the invention.

BRIEF DESCRIPTION OF DRAWINGS

FIG. 1. Is a table showing alternate basic hydrogen peroxide formulations and their properties relating to weight savings.

FIG. 2. (prior art) Is a table of the basic hydrogen peroxide species solubility and their respective properties.

DETAILED DESCRIPTION OF THE PREFERRED EMBODIMENT

Figure 3:
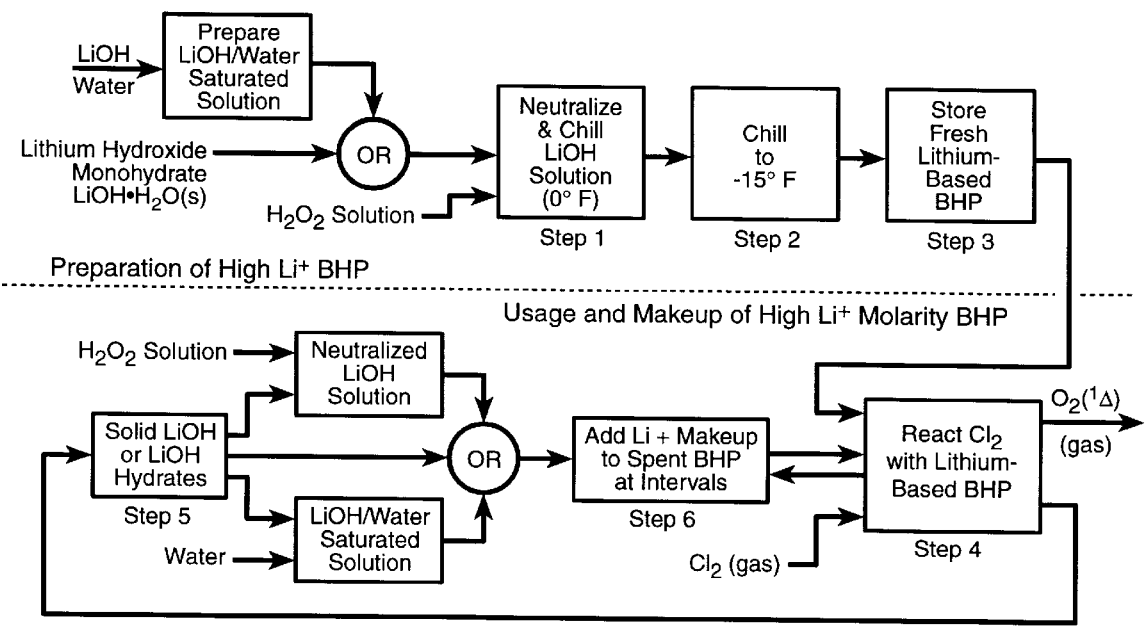
FIG. 3. Is a process diagram showing the steps for making singlet delta oxygen, without salt precipitation, using the lithium hydroxide basic hydrogen peroxide formulation.

In airborne and space based applications of chemical oxygen iodine lasers, light weight and low volume basic hydrogen peroxide must be used that does not result in salts clogging the singlet delta oxygen generator portion of the laser. It is also important that the weight of the chemicals and equipment be kept to a minimum. Cooling equipment can be reduced if the heat of reactions of the chemicals used to produce the singlet delta oxygen are also low. Further the vapor pressure should be kept low to less than 1.5 torr.

To optimize laser power the following alternate basic hydrogen peroxide formulations were compared. In FIG. 1 is a table with four basic hydrogen peroxide formulations. The table shows a comparison of 1) conventional potassium hydroxide basic hydrogen peroxide formulation weight, 2) mixed hydroxides formulation of potassium, sodium, and lithium, 3) mixed hydroxides and lithium hydroxide makeup method, and 4) an all lithium hydroxide and lithium hydroxides makeup method. The comparison is against a baseline potassium hydroxide based system which weighs 15,000 pounds (12,750 lb of fluid and includes a 2250 lb salt separator).

An all lithium based system has the potential of savings of over 50%, by weight and volume, when compared to conventional potassium based system. FIG. 1 shows that the major benefit of the all lithium hydroxide and lithium hydroxide makeup system is the higher effective base molar change and the realized weight savings. Weight savings realized, as shown in the third column, shows that the all lithium based basic hydrogen peroxide, with an effective 12 molar depletion, can save as much as 7500 lbs. over conventional baseline basic hydrogen peroxides.

As shown in FIG. 1, the lower density of lithium-based basic hydrogen peroxide results in a smaller volume of the basic hydrogen peroxide required. Further, as shown in the last column of the figure, the salt formation (0%) over the entire effective utilization of this basic hydrogen peroxide is lowest for lithium hydroxide with lithium hydroxide makeup. This is a large improvement over the baseline potassium hydroxide case which is 8 times over the solubility limit and forms copious quantities of salt—on the order of 35–45% solids, by weight, in solution.

In FIG. 2 is a table of the solubilities of both hydroxides and chlorides in water. One of the problems with lithium hydroxide initially is that it has a very low solubility in water and water/hydrogen peroxide solutions. As a result of our investigations and experiments, we have found that lithium hydroxide is more soluble with higher hydrogen peroxide concentration in the basic hydrogen peroxide. Also, FIG. 2 shows that the lithium chloride has the highest solubility of all the metallic chlorides—lithium, sodium and potassium. In summary, the lithium hydroxide initially has a low hydroxide solubility but the chlorides have a very high solubility. Also shown in this table is potassium hydroxide which has a very high solubility initially in water but the chloride has the lowest solubility of the three metallic species. So it is the low potassium chloride solubility that leads to salt precipitation very early in the depletion of potassium based basic hydrogen peroxide.

However, as the lithium hydroxide reacts with chlorine, it has been discovered that as the hydroxide in solution is depleted its' chemical ability to dissolve more hydroxide into solution with lithium hydroxide is enhanced. This can be effected by a number of methods. One method is to pre-grind the lithium hydroxide and add it to the lithium hydroxide dissolved base whereupon with the reaction with chlorine, the lithium hydroxide is immediately dissolved to it's solubility limit in solution and automatically replenishes the base. At the same time lithium chloride does not precipitate because of its' high solubility as shown in FIG. 2.

The reaction chemistry for the lithium hydroxide with lithium hydroxide makeup is as follows:

1) Initial neutralization reaction to form basic hydrogen peroxide and make-up reaction:

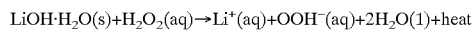

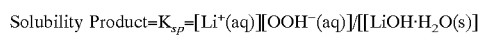

2) Reaction of basic hydrogen peroxide with $Cl_2$ resulting in soluble salts in solution:

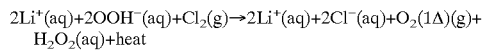

3) Precipitation of insoluble Lithium Chloride:

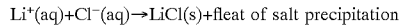

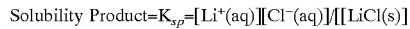

Once formed by the reaction of chlorine gas with basic hydrogen peroxide, soluble lithium salts (in reaction 2) are preferred since they lead to extended mission durations with lower basic hydrogen peroxide weights (due to lighter molecular weight and density of lithium based mixtures). Lithium chloride salt solubility, as expressed in reaction 3 by the solubility product (Ksp), is several times higher than that of potassium or sodium salts.

If large quantities of salts are produced, the chemical oxygen iodine laser will get plugged with salts and will no longer function. Therefore it is important to eliminate the production of salts when using basic hydrogen peroxide.

The process of making all lithium based basic hydrogen peroxide is shown in FIG. 3 and explained as follows:

In step 1 solid lithium hydroxide monohydrate ($LiOH \cdot H_2O$) is added to a high concentration of hydrogen peroxide ($H_2O_2$) of up to 70 to 90 weight percent in water solution. The resultant high molarity hydrogen peroxide ($H_2O_2$) is passed over a bed of lithium hydroxide solid and maintained at between +15° F. and +300° F. to achieve as much dissolution of the lithium hydroxide into solution as possible yielding basic hydrogen peroxide.

In step 2 the lithium based basic hydrogen peroxide is cooled down to on the order of −15° F.

It is then stored at −10° F. or less as step 3 to improve its storage shelf life.

In step 4 the basic hydrogen peroxide is reacted with chlorine, to produce singlet delta oxygen ($O_2(^1\Delta)$) for the chemical oxygen iodine laser. The singlet delta oxygen ($O_2(^1\Delta)$) from step 4 goes to the nozzle of the chemical oxygen iodine laser.

In step 5, the spent basic hydrogen peroxide is either passed over a bed of lithium hydroxide solids or if it is in a slurry form, the lithium hydroxide is already available in the liquid. The solid lithium hydroxide will basically dissolve and replenish the hydroxide in solution, so it pumps back up the base concentration.

In step 6, the temperature of the basic hydrogen peroxide is maintained at −150° F. The basic hydrogen peroxide then can be reacted with chlorine to produce singlet delta oxygen ($O_2(^1\Delta)$) for the chemical oxygen iodine laser as in step 4. This recycling of the spent basic hydrogen peroxide from steps 5 and 6 back to step 4 reduces the overall weight of the airborne chemical oxygen iodine laser by reducing the volume of chemicals needed to operate the system.

Figure 4:
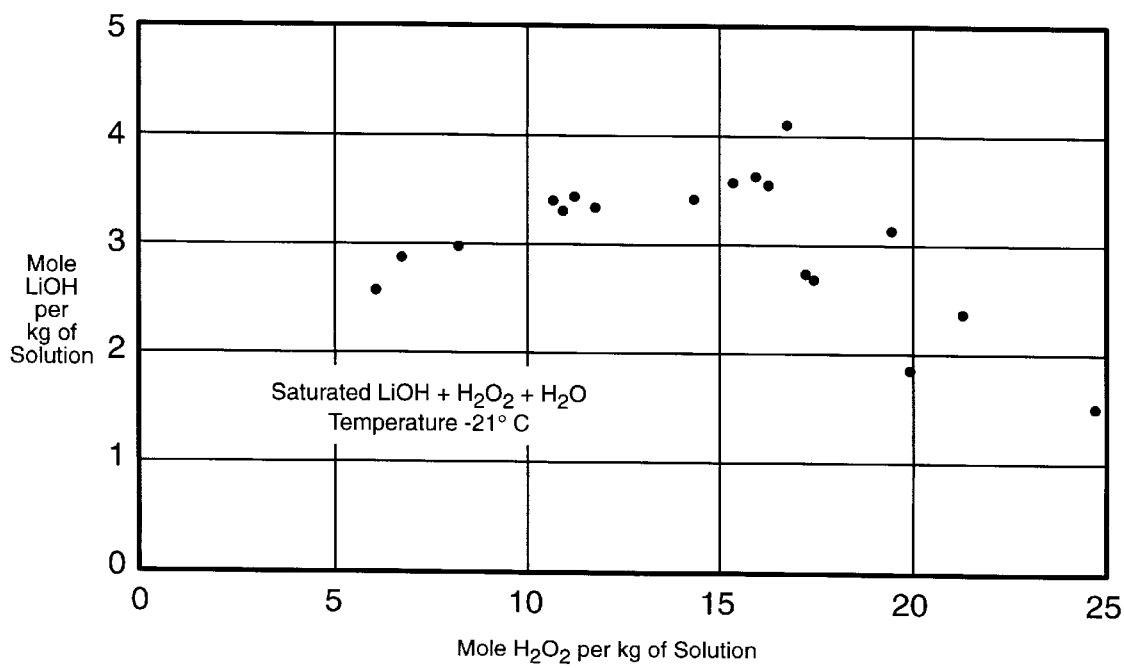
FIG. 4. Is a chart of Lithium hydroxide solubility in various concentrations of hydrogen peroxide at −21° C.

FIG. 4 shows the solubility of lithium hydroxide in concentrated solutions of hydrogen peroxide from 5 to 20 molar. The data shows that on the order of 3 to 4 moles per liter of lithium hydroxide can be dissolved in strong hydrogen peroxide solutions.

Figure 5:
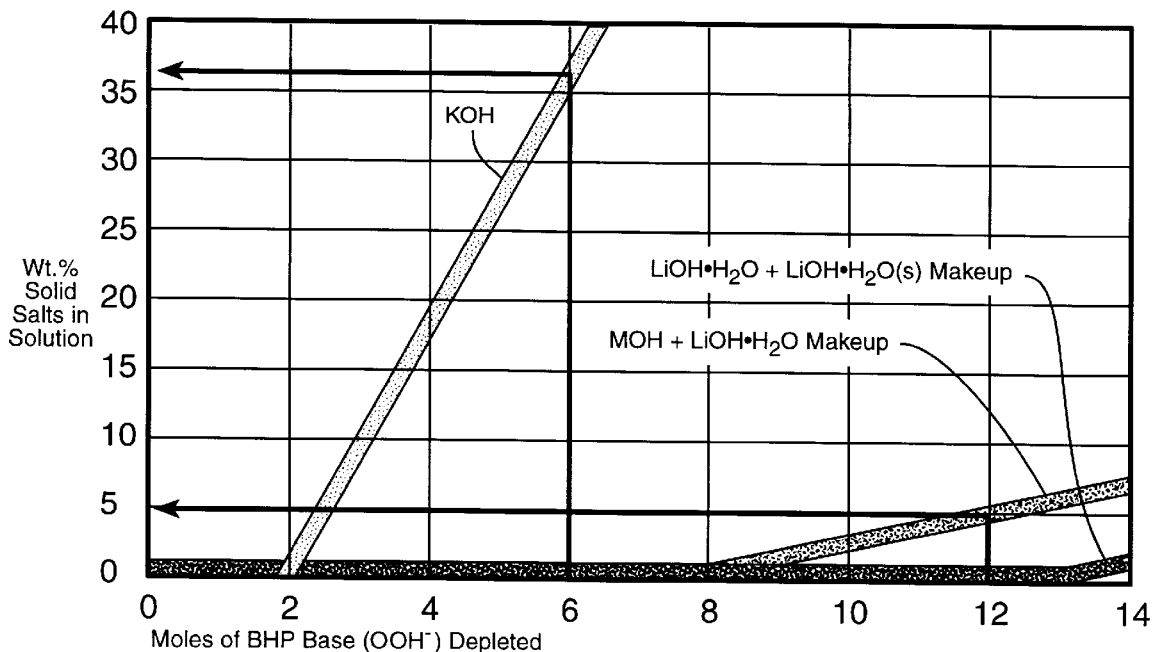
FIG. 5. Is a chart of lithium chloride solubilities compared to potassium and mixed hydroxide solubilities.

FIG. 5 is a chart showing the 11–12 molarity solubility of the salts of lithium/lithium chloride compared to conventional and mixed base BHPs. One of the benefits of not forming salt over the entire molarity range is eliminating the heat of precipitation which leads to further weight savings in the thermal management system coolant supply.

Figure 6:
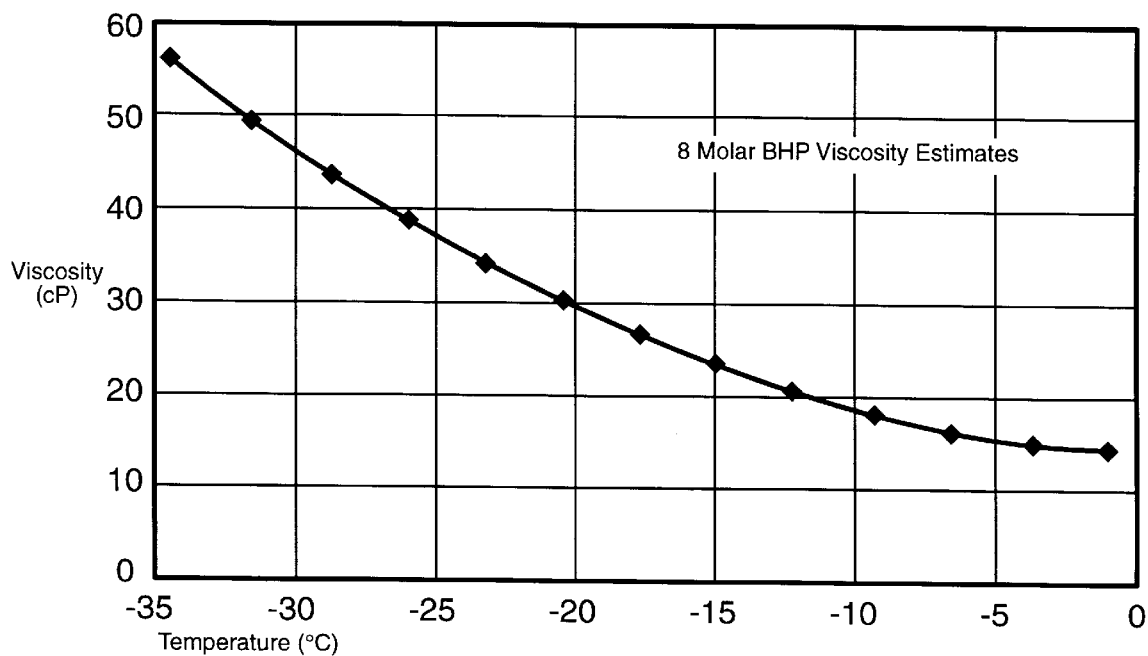
FIG. 6. Is a chart of the base liquid viscosity of 8 molar base in hydrogen peroxide/water solution.
Figure 7:
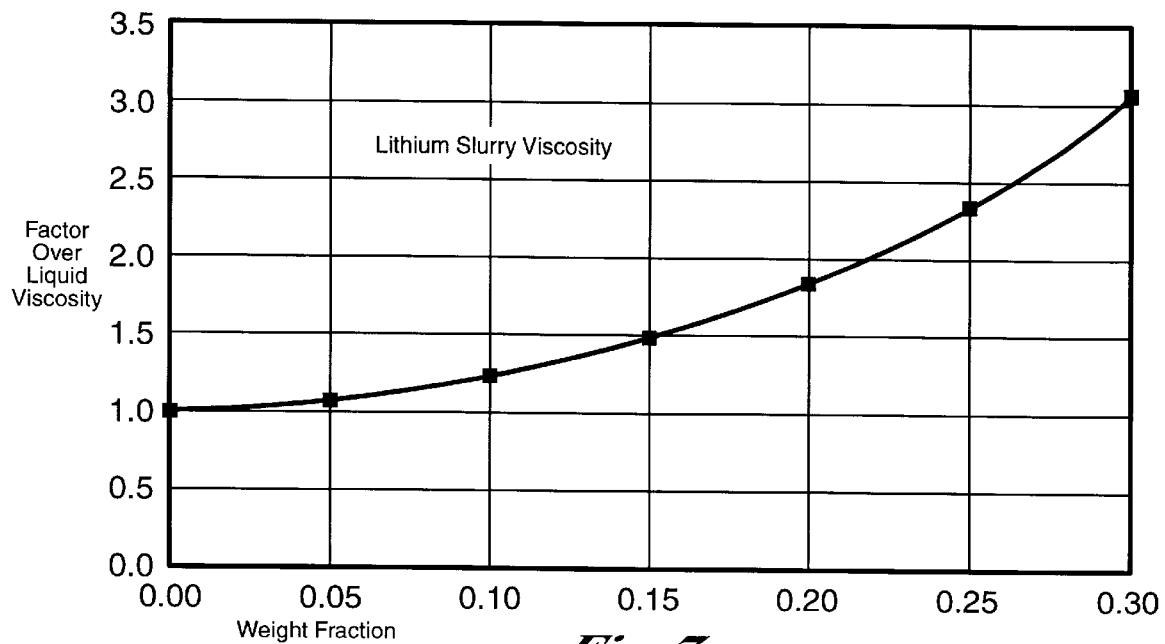
FIG. 7. Is a chart of estimated viscosity increase with solid wt % of lithium hydroxide based particulates (100% less than 100 microns).

The viscosity of the base liquid is increased, according to data and calculations shown in FIGS. 6 and 7. For typical solutions of up to 15% by weight solids, the viscosity increase is on the order of 50% over the base liquid viscosity. Thus, BHP viscosity of 30 centipoise without solids would exhibit a 45 centipoise apparent viscosity with 15% by weight solids in BHP slurry.

Figure 8:
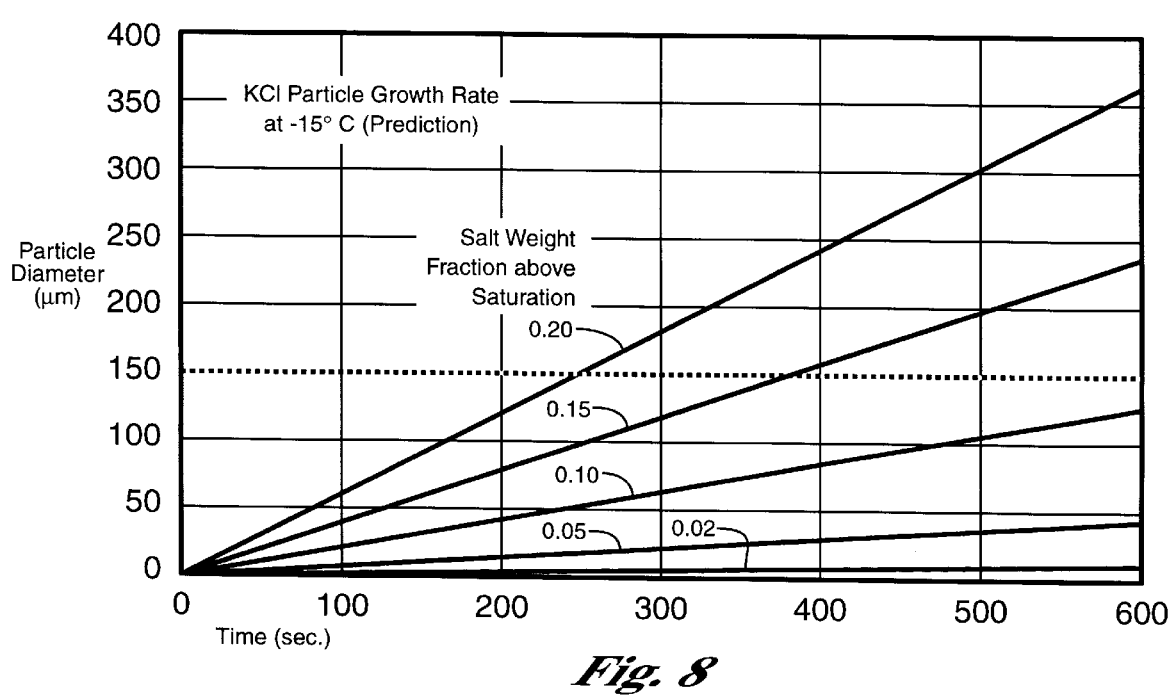
FIG. 8 Is a chart of salt particle growth rates and sizes in conventional potassium based BHP.

Particulate salt growth rates are very fast in conventional potassium-based BHP as in the estimates shown in FIG. 8. Particle sizes on the order of 300 microns can be formed within 10 minutes of reaching the saturation limit of potassium chloride. This size would plug orifices of similar sizes.

Figure 9:
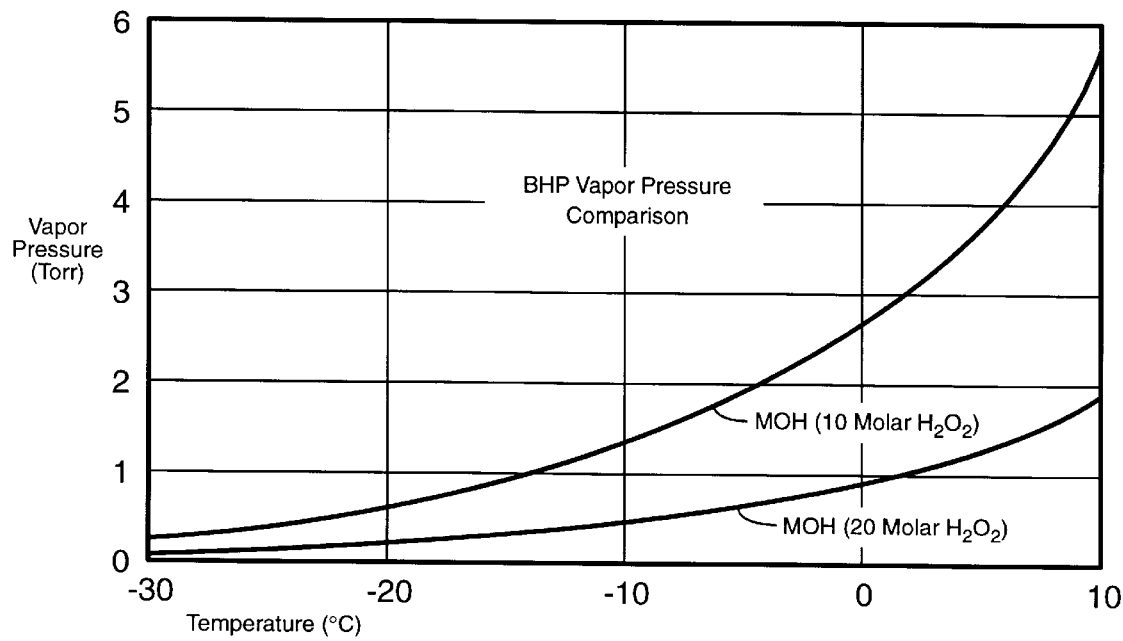
FIG. 9. Is a chart of vapor pressure estimates of high molarity hydrogen peroxide lithium-based basic hydrogen peroxide.

Shown in FIG. 9 are the beneficial effects of increasing the hydrogen peroxide concentration in lithium-based BHP on water vapor pressure. Increasing the hydrogen peroxide molarity of the mixture to 15–24 moles/liter can decrease vapor pressures to less than 1.5 torr at −5° C.

Figure 10:
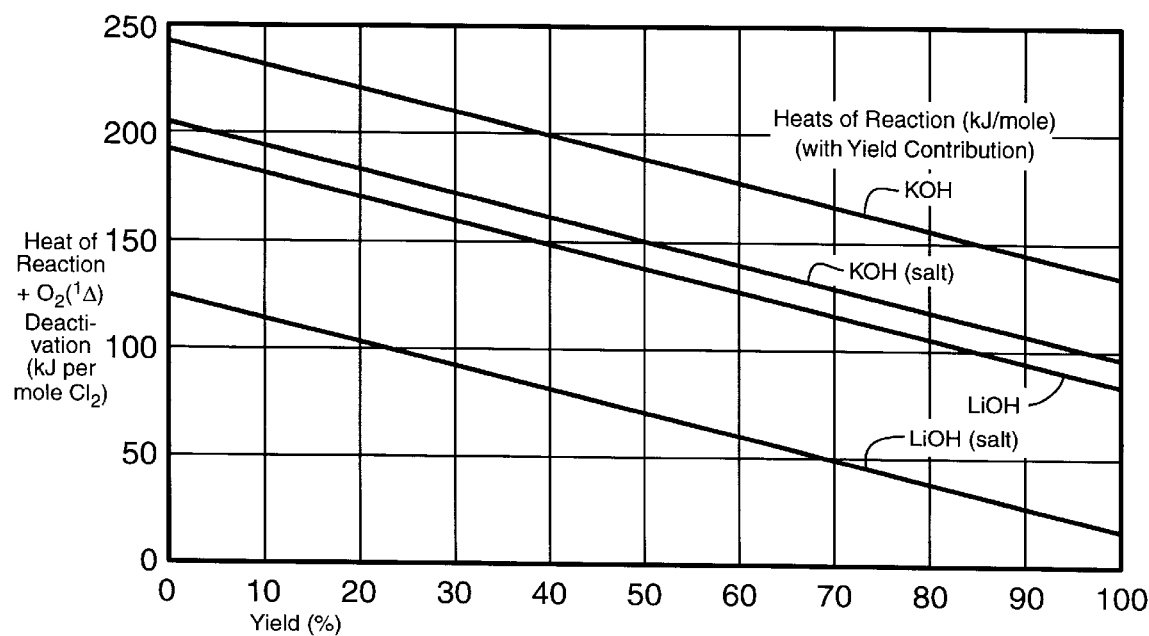
FIG. 10 Is a chart of heats of reaction with chlorine with potassium or lithium based BHP and the heat of salt precipitation.

Lower heats of reaction of all Lithium based mixtures is shown in FIG. 10, as a function of nascent $O_2$ yields (BHP surface $O_2$ yields). Heats of reaction are estimated to be 10 to 20% lower than potassium based mixtures and if salt precipitates the heat of precipitation of the all Lithium based BHP is 50% lower than conventional BHP.

It is feasible and verified by experiment that on the order of up to 12 molar depletion of base can be effected without salt formation (See FIGS. 11–20). Higher molarities are achieved by a method of makeup which includes either a solution of lithium hydroxide or solid lithium hydroxide. Salt solubility increases are on the order of 2 to 8 times those exhibited in either mixed hydroxide or potassium based hydroxide BHPs. It has also been determined that through the use of the solid lithium hydroxide, one is able to not only use a very high lithium hydroxide molarity; but also, a very high hydrogen peroxide molarity which results in a low viscosity mixture and a lower vapor pressure mixture.

Another benefit of the higher depletion molarities of all lithium-based system basic hydrogen peroxide is that, for the same weight, the utilization capability of the basic hydrogen peroxide is doubled and the mission duration of the laser is doubled. Because of a single base solution, the method of production is very simple and quite comparable to conventional basic hydrogen peroxides. Also, compared to mixed hydroxide formulations, which involve many processing steps, the only steps involved in the preparation of the all lithium mixture is to just add the base to the hydrogen peroxide, which is the conventional "potassium hydroxide" way of making basic hydrogen peroxide.

There are some special considerations for the method of producing slurries of all lithium based basic hydrogen peroxide for use in a chemical oxygen iodine laser. For a chemical oxygen iodine laser pump loop system, there are limits on the maximum particle size and maximum viscosity exhibited by the mixture. For example, a jet pump system which has orifice diameters on the order of 10–15 mils (15 thousands of an inch or 375 microns) would require on the order of 150 microns top size on the particle size (roughly 50% of the orifice diameter to pass the slurry of solids through the orifice). A minimum size to maintain viscosity control on the mixture is also required—specified to be no less than 1–10 microns. So a particle size range for this particular mixture would be on the order of greater than 98%, by weight, between 1 microns and 150 microns. We have conducted experiments where we have ground lithium hydroxide to much finer sizes and have achieved viscosities that are much too high. The particle size greater than 150 microns leads to orifice plugging in the jet generators. Other types of oxygen generators, for example, rotating disc singlet delta generators (i.e. rotocoil), are more tolerant to particle size distribution and may only require particle sizes that are larger —15 to 300 microns for example. Both types of generators have been tested with mixed hydroxides with lithium particulates with success.

As small particle size range also leads to very little pump erosion in pump loop systems. Both of chemical oxygen iodine lasers types (jet pumped loop and rotocoil pumped loop) today use pump loop recirculation systems. The hardness of the lithium is soft compared to the materials of the pump and for the components in the loop we have found very little with slurries.

The reactivity of all lithium based BHP are the same as conventional potassium hydroxide bases. That is, lithium based basic hydrogen peroxide gives the same yield of oxygen (60 to 100%) when reacted with chlorine. This yield has been measured in COIL lasers and also observed visually in test tube experiments in which the glow of the reaction has been recorded (See FIG. 14).

As is known in the art Fluorine, Bromine, Iodine or Astatine can be substituted for Chlorine in the above described reactions since they are all group 17 halogens.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A lithium hydroxide base slurry for producing basic hydrogen peroxide comprising solid and dissolved lithium hydroxide and hydrogen peroxide water solution.

2. A lithium hydroxide base slurry for producing basic hydrogen peroxide as in claim 1 wherein, the dissolved lithium hydroxide is up to 5 moles per liter, the hydrogen peroxide is up to 24 moles per liter and solid lithium hydroxide of up to 10 moles per liter is added to yield a desired molarity basic hydrogen peroxide.

3. A lithium hydroxide base slurry for producing basic hydrogen peroxide as in claim 1 wherein, the particle size of the solid lithium hydroxide is less than 500 microns, to enhance solution rate in the slurry and lower the viscosity.

4. A lithium hydroxide base slurry for producing basic hydrogen peroxide as in claim 1 wherein, a lithium hydroxide monohydrate added to the lithium hydroxide base slurry is used to lower heat of mixing.

5. A lithium hydroxide base slurry for producing basic hydrogen peroxide as in claim 1 wherein, the hydrogen peroxide concentrations are at least the lithium hydroxide concentration and as high as 24 moles per liter to lower freezing points and lower slurry vapor pressure.

6. A lithium hydroxide base slurry for producing basic hydrogen peroxide as in claim 1 wherein, the slurry is maintained at less than 10° C. to prevent decomposition and maximize storage shelf life.

7. A lithium hydroxide base slurry for producing basic hydrogen peroxide as in claim 1 wherein, a lithium hydroxide concentration of greater than 4 moles per liter and a hydrogen peroxide concentration greater than 10 moles per liter has a freezing point less than −30° C.

8. A lithium hydroxide base slurry for producing basic hydrogen peroxide as in claim 1 wherein, a lithium hydroxide concentration of greater than 6 moles per liter and a hydrogen peroxide concentration greater than 10 moles per liter has a freezing point less than −30° C.

9. A lithium hydroxide base slurry for producing basic hydrogen peroxide as in claim 1 wherein, a lithium hydroxide concentration of greater than 8 moles per liter and a hydrogen peroxide concentration greater than 10 moles per liter has a freezing point less than −40° C.

10. A lithium hydroxide base slurry for producing basic hydrogen peroxide as in claim 1 wherein, a hydrogen peroxide concentration of greater than 10 moles per liter has a vapor pressure less than 2 torr.

11. A lithium hydroxide base slurry for producing basic hydrogen peroxide as in claim 1 wherein, the final mixtures have densities in a range of 1.1 to 1.3 grams per milliliter at 10° C.

12. A lithium hydroxide base slurry for producing basic hydrogen peroxide as in claim 1 wherein, a total hydroxide of up to 12 moles per liter has no solid salt content.

13. A lithium hydroxide base slurry for producing basic hydrogen peroxide as in claim 1 wherein, a total hydroxide of up to 14 moles per liter has less than 1 weight % solid salt in solution.

14. A lithium hydroxide base slurry for producing basic hydrogen peroxide as in claim 1 wherein, the viscosities of final mix are less than 50 centipoise at 0° C.

* * * * *